United States Patent [19]

Daffara

[11] Patent Number: 5,684,842
[45] Date of Patent: Nov. 4, 1997

[54] DIGITAL TRANSMISSION SYSTEM COMPRISING A RECEIVER WHICH INCLUDES A CARRIER RECOVERY CIRCUIT

[75] Inventor: Flavio Daffara, Paris, France

[73] Assignee: U.S. Philips Corporation, New York, N.Y.

[21] Appl. No.: 499,876

[22] Filed: Jul. 10, 1995

[30] Foreign Application Priority Data

Jul. 12, 1994 [FR] France ................. 94 08653
Apr. 12, 1995 [FR] France ................. 95 04399

[51] Int. Cl.$^6$ ................. H04L 7/00; H03D 3/24
[52] U.S. Cl. ................. 375/354; 375/373; 375/326
[58] Field of Search ................. 375/354, 371, 375/376, 373, 362, 324, 327, 325, 326; 327/141, 146, 147, 150, 155, 156, 159, 162, 163

[56] References Cited

U.S. PATENT DOCUMENTS 4,283,682 8/1981 Sifford et al. ................. 375/327
4,648,100 3/1987 Mardirosian ................. 375/376

FOREIGN PATENT DOCUMENTS 0118156 9/1984 European Pat. Off. ........ H04L 27/06

*Primary Examiner*—Stephen Chin
*Assistant Examiner*—Hai H. Phan
*Attorney, Agent, or Firm*—David R. Treacy

[57] ABSTRACT

A carrier recovery circuit includes a correction circuit for correcting phase differences which appear betwen a complex input signal and a local carrier supplied by a local oscillator. The correction circuit defines zones in a plane defined by in-phase components and quadrature components of the complex signal. Each zone includes a respective state of a constellation that is used for encoding the signal during transmission. When a point representing the signal in the I/Q plane is subjected to a decision, the correction circuit produces a correction signal proportional to a measured phase difference. When the point lies outside the zones, the correction circuit produces a correction signal that varies as a function of the measured phase difference to which a weighting factor, dependent on the distance from the point to the nearest zone, is applied. In a first mode the correction circuit corrects either the local oscillator phase or frequency; or in a second mode, corrects the signal phase.

12 Claims, 7 Drawing Sheets

DIGITAL TRANSMISSION SYSTEM COMPRISING A RECEIVER WHICH INCLUDES A CARRIER RECOVERY CIRCUIT

DESCRIPTION

FIELD OF THE INVENTION

The invention relates to a digital transmission system comprising a transmitter and a receiver, which receiver comprises:
- converting means for converting a received signal that has been encoded according to states of a constellation into a baseband signal comprising two mutually quadrature components,
- digitizing means for digitizing the baseband signal,
- decision means for estimating the constellation state nearest to the digitized baseband signal,
- synchronizing means for estimating a phase difference between the estimated state and the baseband signal, and for correcting the phase difference by forming a correction signal.

The invention likewise relates to a receiver for demodulating an input signal that has been modulated by amplitude and phase steps utilized in such a digital transmission system.

More particularly, systems may be concerned for which an information signal, after being transmitted by electromagnetic wave modulation, is recovered by coherent demodulation. These systems are applied to data transmission modems, radio waves, spatial communication systems or optical communication systems in the case of heterodyne links.

BACKGROUND OF THE INVENTION

To provide coherent demodulation according to a known technique, the phase of the carrier wave is generally recovered with the aid of an oscillator inserted in a carrier recovery loop. This oscillator is voltage controlled by a filtered version of the output signal of a phase detector which detector detects the phase difference between the oscillator and the transmitted carrier.

Another known technique consists of performing an entirely digital process by using a fixed frequency oscillator and a phase estimator.

In both cases, for digital modulations with a large number of states, the phase difference between the oscillator and the carrier is certainly to be limited to small values. The noise band of the recovery loop is thus reduced via a narrow-band low-pass filtering.

A carrier recovery circuit according to the first technique is described in European Patent Specification No. 0 118 156. By representing the in-phase component I and quadrature component Q of the received complex signal in a plane I,Q, this document shows an effectuation of the synchronization of the local oscillator in that a correction signal is applied to the local oscillator during zones of the plane I,Q with respect to which zones the complex input signal is situated. Furthermore, on transmission, the complex signal is the result of a coding by amplitude and phase steps which, in the plane I,Q, give rise to a representation by a state constellation. The preceding zones are determined with respect to the states of the constellation. But this carrier recovery circuit does not have the object of minimizing the phase jitter in the permanent state.

The second cited technique is known, for example, from the document: "Demodulator Reference Recovery Techniques Suited For Digital Implementation", F. M. GARDNER, European Space Agency, ESTEC Contract number 6847/86/NL/DG, Chapter 8, pp. 200 to 258, August 1988.

This document describes a receiver in which a received signal, transformed to the intermediate frequency, is converted into a baseband signal by an oscillator which operates with a fixed frequency. The signal is then digitized to be subjected to the operation of a decision element which estimates what state of the constellation the baseband signal is closest to. For correcting the frequency and phase differences, the baseband signal is multiplied by correction signals before the decision is made.

It is known that in a carrier recovery circuit operating as a closed loop the minimum phase jitter it can achieve called Cramer-Rao limit is given by the following relation:

$$\sigma^2 = 2B_L \times T/SNR$$

where $\sigma^2$ is the static phase variance,
$B_L$ is the bandwidth of the one-side loop
SNR is the signal-to-noise ratio, and
T is the symbol period.

SUMMARY OF THE INVENTION

It is an object of the invention to minimize the phase jitter and go to this boundary as much as possible so as to ensure a synchronization attended with the least possible phase jitter even if there is a very low signal-to-noise ratio.

This object is achieved with a digital transmission system of the type described in the opening paragraph, in which the receiver comprises synchronizing means which form the correction signal in dependence on zones of the plane I,Q in which the point that represents the digitized baseband signal is situated, the synchronizing means being such that, on the one hand, in first non-contiguous zones each containing a respective state of the constellation, the correction signal is proportional to the phase difference measured between the initial baseband signal and the nearest state of the constellation and, on the other hand, the synchronizing means being such that in second zones, outside the first zones, the correction signal varies with said phase difference weighted with a weighting factor that depends on the signal subjected to a decision called decision-subjected point here, while the weighting factor progressively decreases when the decision-subjected point passes a border line of the first zone nearest to said point up to a boundary situated at equal distance from adjacent pairs of states, while the boundary is the nearest boundary to said point.

The phase jitter is then reduced considerably compared with the prior-art techniques.

According to a first embodiment of the first technique, preferably the correction means comprise a look-up Table which is addressed by the in-phase component and by the quadrature component of the complex signal, while the Table supplies the correction signal adapted to each point of the plane I,Q. According to a second embodiment of the first technique the correction means comprise a phase detector which measures the phase differences, zone reconnaissance means which supply weighting factors relating to the zones and weighting means for weighting with the respective weighting factor the phase difference measured by the phase detector and for supplying the correction signal.

According to the second technique, the received, intermediate frequency transferred signal is converted into a baseband signal by an oscillator which operates at a fixed frequency. The baseband signal, after being digitized, is then phase and frequency-corrected by purely digital techniques. More particularly, the synchronizing means comprise digital phase shifting means for converting the phase shift, weighted with the appropriate weighting factor, into a complex correction signal which is digitally multiplied by the baseband signal for shifting the phase of that signal.

The phase shifting means comprise:

generator means for generating an intermediate complex signal which determines the phase difference, zone reconnaissance means which produce weighting factors relating to the zones, weighting means for weighting with the respective weighting factor the complex intermediate signal that determines the phase difference, means for producing the complex correction signal based upon the weighted complex intermediate signal which characterizes the weighted phase difference.

The phase shifting means may comprise calculating means for calculating weighted mean values of the complex intermediate signal addressing the means for producing the complex correction signal.

The invention likewise relates to a receiver for a digital transmission system, which receiver comprises:

converting means for converting a received signal encoded according to states of a constellation into a baseband signal which comprises two mutually quadrature components, digitizing means for digitizing the baseband signal, decision means for estimating the constellation state nearest to the digitized baseband signal, synchronizing means for estimating a phase difference between the estimated state and the baseband signal, and for correcting the phase difference by forming a correction signal, characterized in that the two components which define a point that represents the received signal in a plane I,Q in which are also indicated the states of the constellation, the synchronizing means forming the correction signal in dependence on zones of the plane I,Q in which the point that represents the baseband digitized signal is positioned, and are such that, on the one hand, in first non-contiguous zones containing each a state of the constellation, the correction signal is proportional to the phase difference measured between the initial baseband signal and the nearest state of the constellation and in that, on the other hand, the synchronizing means are such that in second zones, outside the first zones, the correction signal varies with said phase difference weighted with a weighting factor that depends on the signal subjected to a decision called decision-subjected point here, while the weighting factor progressively decreases when the decision-subjected point passes a border line of the first zone nearest to said point up to a boundary positioned at equal distance from adjacent pairs of states, whereas the boundary is the boundary nearest to said point.

These and other aspects of the invention will be apparent from and elucidated with reference to the embodiments described hereinafter.

DESCRIPTION OF EMBODIMENTS

A—CARRIER RECOVERY TECHNIQUE

Figure 1:
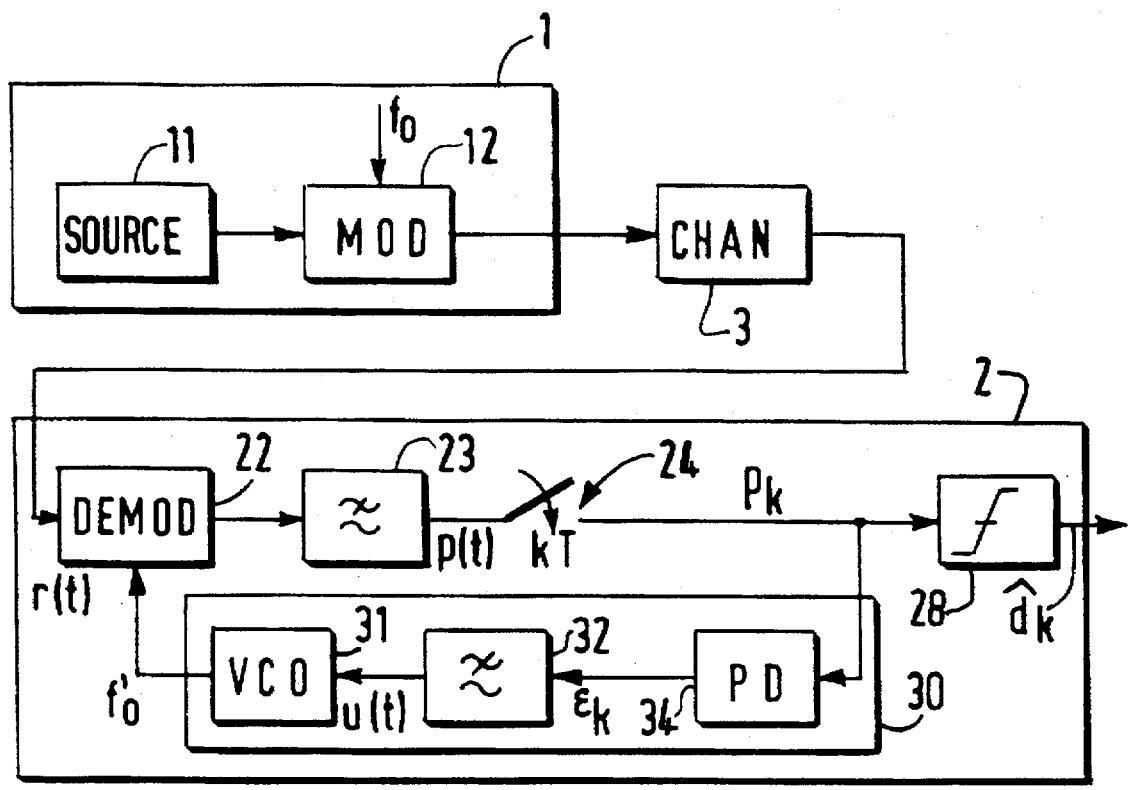
FIG. 1 shows a diagram of a prior-art digital transmission system comprising a data transmitter, the transmitter channel and a data receiver (first technique).

FIG. 1 shows a digital transmission system comprising a transmitter 1, which includes a data source 11 and modulation means 12 by a carrier $f_o$ for transmitting the data, a transmitter channel 3, a receiver 2, comprising a demodulator 22 followed by filter means 23 which produce a signal p(t) in the filtered baseband zone, sampling means 24 for sampling the filtered signal p(t) and supplying samples $p_k$, a carrier recovery circuit 30, decision means 28 for producing estimated samples $â_k$ of the data transmitted by the transmitter.

According to the prior art, the carrier recovery circuit 30 comprises a local oscillator 31 which produces a carrier $f'_o$ controlled by the frequency of the carrier of the transmitter. The carrier $f'_o$ enters the demodulator 22 for realising the demodulation of the received complex signal r(t) which enters the receiver. To correct the local oscillator 31, the carrier recovery circuit 30 comprises correction means 34 (for example, a phase detector) to determine zones of the plane I,Q in which zones the received baseband signal is situated (samples $p_k$) and to determine values of a correction signal $\epsilon_k$ which depends on the zones in which the complex signal appears. The correction signal $\epsilon_k$ is filtered in filter means 32 which produce a filtered correction signal u(t) which corrects the local oscillator 31.

Figure 2:
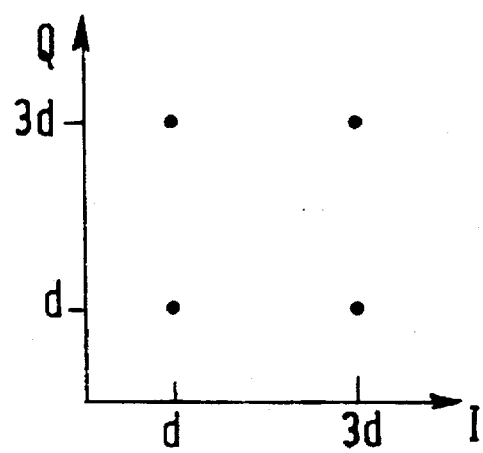
FIG. 2 shows part of a constellation relating to a QAM16 modulation shown in a quarter diagram.

FIG. 2 shows an example of a constellation shown in the plane I,Q of the in-phase component I and quadrature component Q of a signal resulting from a modulation by amplitude and phase steps. FIG. 2 relates by way of example to a 16 QAM modulation shown in a quarter plane. This may also refer to another type of modulation. The quarter of the constellation is formed by four states (d,d), (d,3d), (3d,d), (3d,3d). The other states in the other quarters of the plane are derived by symmetry.

Figure 3:
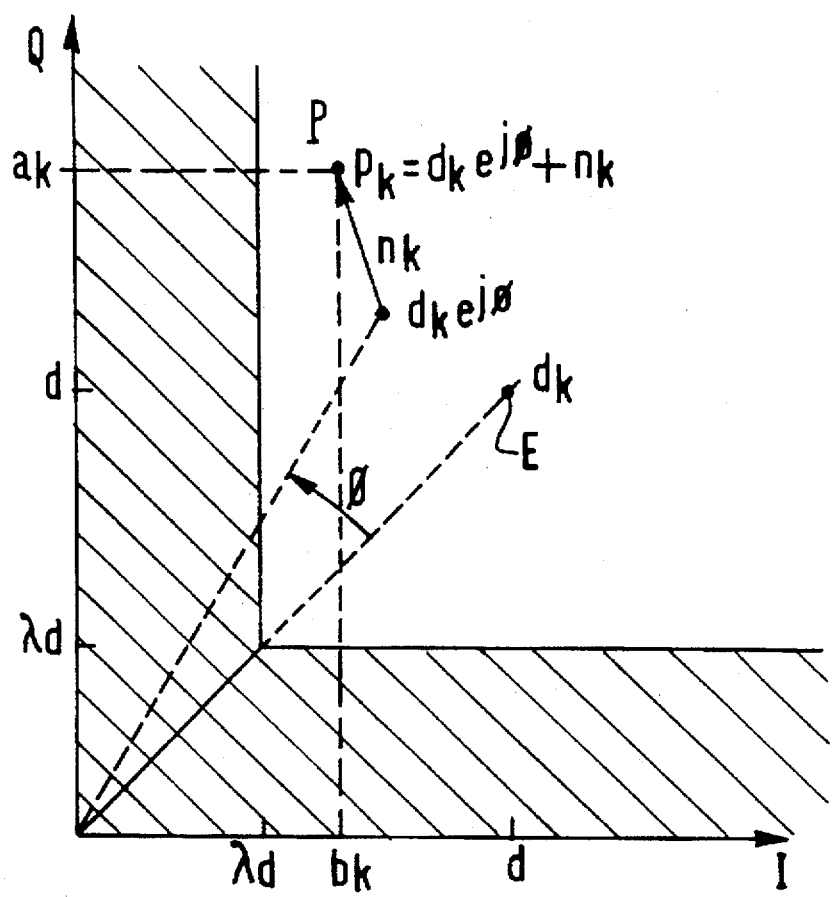
FIG. 3 shows a diagram of the disturbance caused by the transmitter channel and by the phase error.

FIG. 3 shows a state E of the constellation. Let us suppose that, on transmission, a symbol $d_k$ is transmitted corresponding to this state E. On reception, this symbol $d_k$ will be received with a shift of phase $\phi$ which transforms the symbol $d_k$ into a symbol $d_k \cdot e^{j\phi}$ which itself may be affected by noise $n_k$, which transforms same into a symbol $p_k = d_k \cdot e^{j\phi} + n_k$ represented by the point P.

The receiver is thus to estimate a symbol $\hat{d}_k$ identical to the transmitted symbol $d_k$ based upon the symbol $p_k$. This is realised by a decision operation.

For correcting the phase error $\phi$, a phase error detector is used which produces a correction signal $\epsilon_k$ which corrects the local oscillator.

The phase error signal is defined, for example, by:

$$\epsilon_k = I_m \{p_k \times \hat{d}_k^*\} \quad (1)$$

where $I_m$ denotes the "imaginary part of" and where $\hat{d}_k^*$ is the conjugate of the estimated symbol $\hat{d}_k$, and x represents a multiplication.

A conventional manner of evaluating the performance of the phase detector consists of measuring the static variance of phase $\sigma^2$, or phase jitter, in the phase recovery circuit and of comparing this phase jitter with a minimum phase jitter limit value called the Cramer-Rao limit, which is such that:

$$\sigma^2 = 2B_L \times T/SNR \quad (2)$$

Experiments have shown that a phase detector operating according to equation (1) shows good performance, provided that the decision that generates the estimated symbol $\hat{d}_k$ is correct. The moment this decision is erroneous, the phase detector will no longer show good performance.

According to the invention, one reckons with the probability of a good decision for weighting the correction signal that acts on the local oscillator. According to the invention (FIG. 4), one zone is defined for each state which zone contains the state in which the decision made is considered a good decision. Outside the zones, the decisions are considered less good, all the more so as the received symbol shown in the plane by the point P (decision-subjected point) is farther away from the zones containing each state. To use this according to the invention, a weighting factor $\gamma_k$ is defined which is equal to 1 when the decision-subjected point is situated inside the zones which contain the states.

The weighting factor $\gamma_k$ progressively decreases when the decision-subjected point is farther away from said zones.

The sampled received symbol:

$$p_k = d_k \cdot e^{j\phi} + n_k$$

can be written in cartesian coordinates as:

$$p_k = a_k + jb_k.$$

Figure 4:
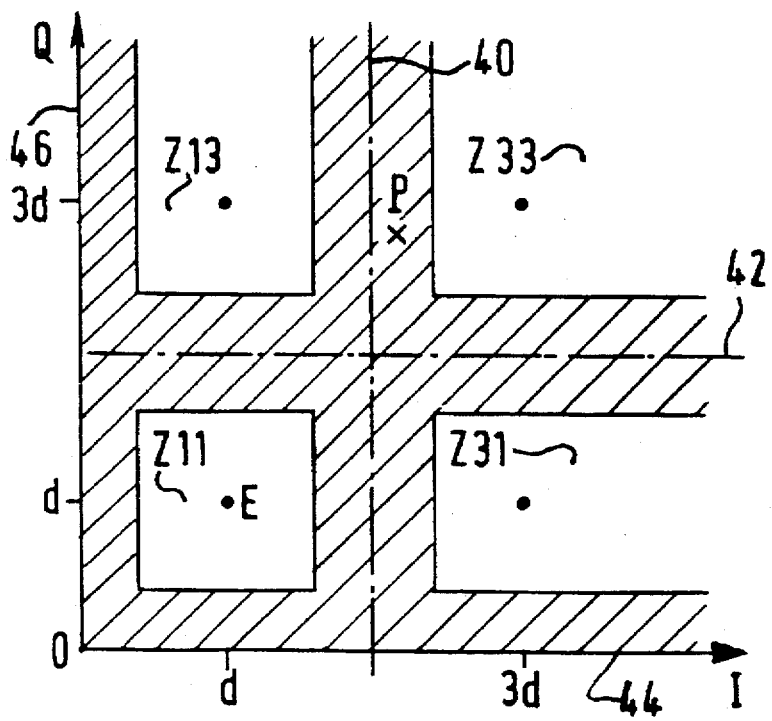
FIG. 4 shows a diagram of the zones containing states of the constellation occurring during the generation of the correction signal.

When the decision-subjected point is situated in the hatched areas of FIGS. 3 and 4, that is to say, outside the zones which contain the states, the weighting factor is such that:

$$\gamma_k = z/(\lambda d)$$

where z is equal to the smaller of the absolute values $a_k$ or $b_k$, that is, $z = \min(|a_k|, |b_k|)$, for a QPSK modulation and where $\lambda$ is a zone defining factor.

In FIG. 4 are shown the zones Z11, Z13, Z31, Z33 containing respectively the states (d,d), (d,3d), (3d,d) and (3d,3d) for a 16-QAM modulation. The weighting factor decreases towards the boundaries 40, 42, 44, 46 which are situated substantially at equal distances from the adjacent states. The zones Z13, Z31, Z33 are not limited for the high values of $a_k$ and $b_k$. They may have different forms from those shown in FIG. 4.

Figure 5:
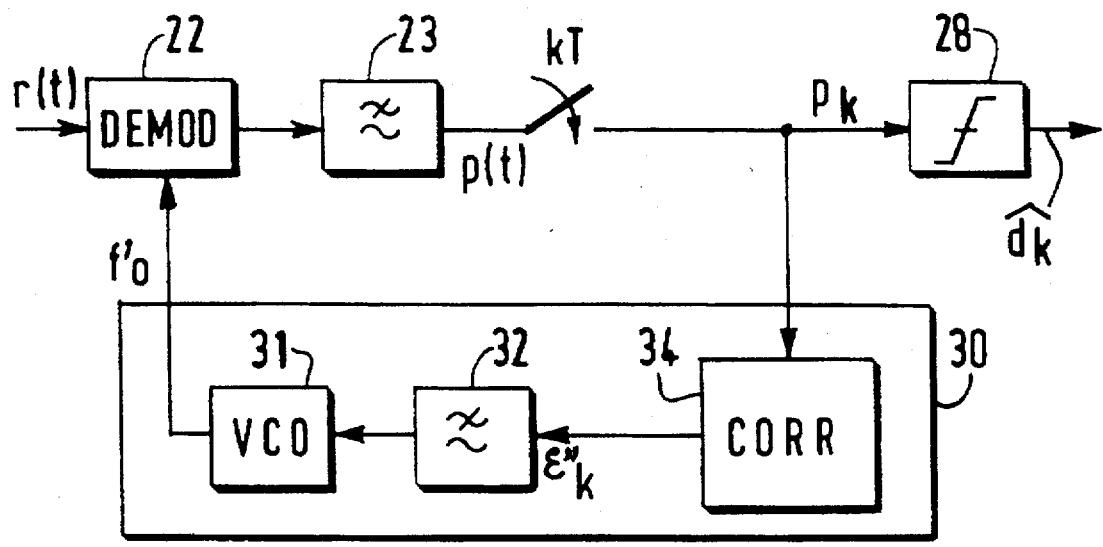
FIG. 5 shows a diagram of a receiver comprising a carrier recovery circuit according to the invention with a first embodiment of correction means (first technique)

FIG. 5 shows an embodiment of the invention. Like elements to those of FIG. 1 are denoted by like references. The carrier recovery circuit 30 comprises in this case correction means 34 for supplying a correction signal $\epsilon_k''$ based upon the components $a_k$ and $b_k$ of the decision-subjected point by causing, on the one hand, the correction signal $\epsilon_k''$ to be proportional to the phase difference measured between the decision-subjected point (point P) and the constellation state closest to point P when the decision-subjected point lies inside the zones Z11, Z13, Z31, Z33, and by causing, on the other hand, the correction signal $\epsilon_k''$ to vary according to said measured phase difference to which is applied a weighting factor that progressively decreases from one to substantially zero between a zone edge and the boundaries defined earlier when the decision-subjected point lies outside said zones. The correction means 34 are preferably formed by a look-up Table stored, for example, in a memory in which the values that have just been defined have been stored earlier, and produce a correction signal $\epsilon_k''$. The correction signal $\epsilon_k''$ thus replaces the correction signal $\epsilon_k$ of FIG. 1.

Figure 6:
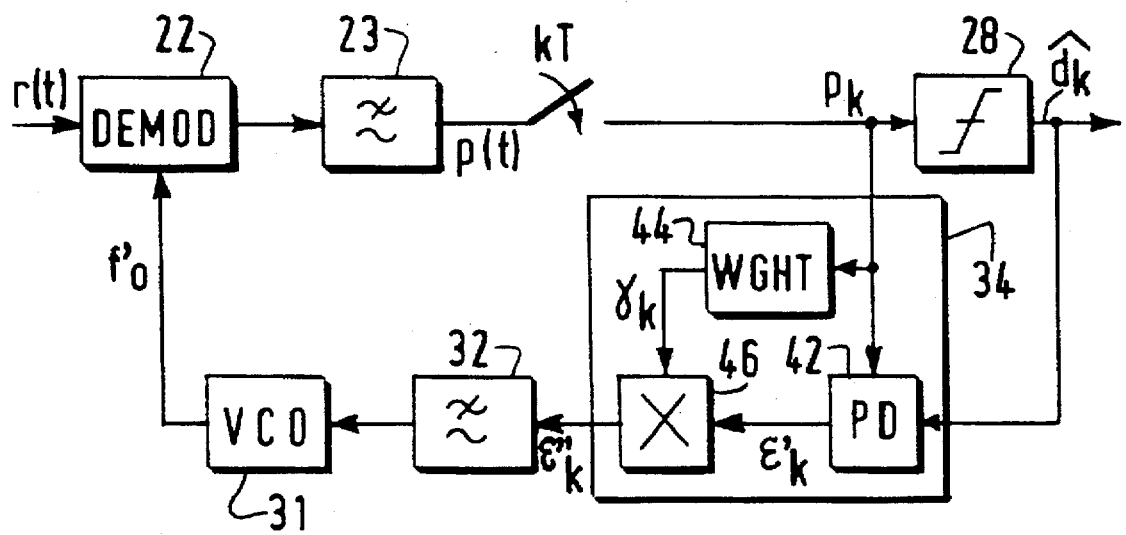
FIG. 6 shows a diagram of a receiver comprising a carrier recovery circuit according to the invention with a second embodiment for correction means (first technique)

According to another embodiment shown in FIG. 6 the correction means 34 are slightly modified in that a phase detector is included. This phase detector measures the phase difference between the decision-subjected point (point P) and the nearest symbol of the constellation (point E) (FIG. 3) and produces an intermediate correction signal $\epsilon_k'$. The correction means 34 also comprise weighting means WGHT 44 for defining the zones and determining the weighting factors $\gamma_k$ it has to apply while taking into account the received complex signal $p_k = a_k + jb_k$. Weighting means 46 then allow of a weighting of the intermediate correction signal $\epsilon_k'$ to produce the correction signal $\epsilon_k''$.

Figure 7:
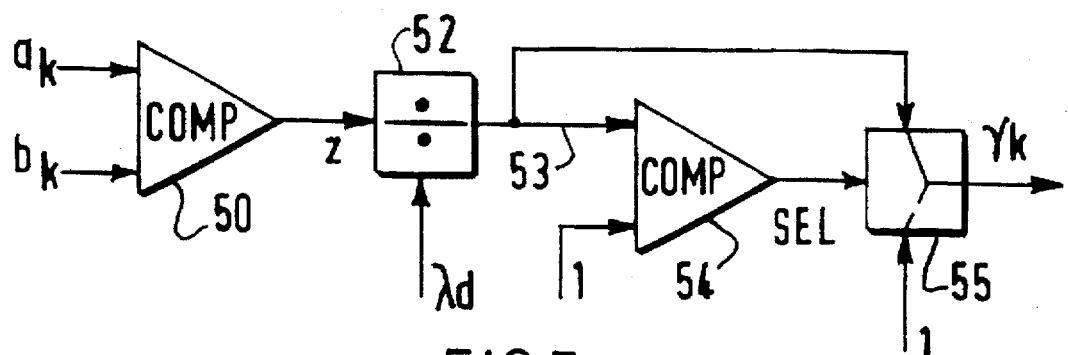
FIG. 7 shows a diagram of another embodiment for generating the weighting factors in correction means.

The weighting means 44 for defining the zones and determining the weighting factors $\gamma_k$ are in this case preferably realised in the form of a look-up Table stored in storage means, for example, a memory. They may also be realised in accordance with the diagram shown in FIG. 7 for a QPSK modulation.

Figure 8:
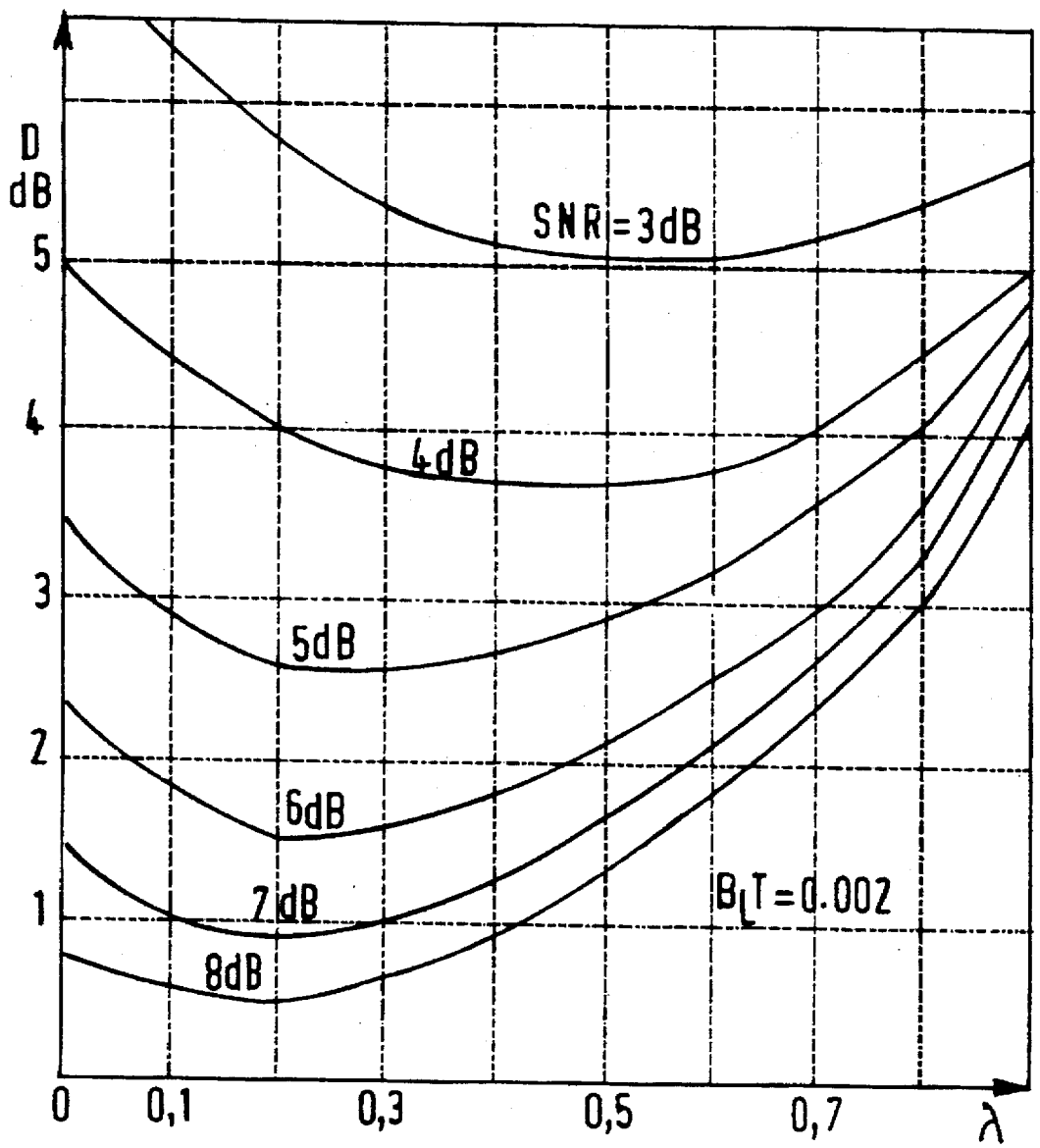
FIG. 8 shows curves indicating the performance of the carrier recovery circuit according to the invention as a function of the weighting factor (first technique)

In this case, a comparing circuit 50 compares the absolute values $a_k$ and $b_k$ and selects the smaller of the two to form the data z, so that $z=\min(|a_k|,|b_k|)$. Divider means 52 for dividing z by $\lambda d$ yield a quotient $z/(\lambda d)$ (connection 53) which is compared with a unit value in a comparator 54 which applies a selection signal to a selector 55 which selector produces the weighting factor $\gamma_k$ which relates to the signal $p_k$, so that:

$\gamma_k = 1$ if $z \geq \lambda d$ $\gamma_k = z/(\lambda d)$ if $z < \lambda d$ FIG. 8 shows the performance obtained with a carrier recovery circuit according to the invention in the case where there is a QPSK modulation. The x-axis corresponds to the weighting factor $\lambda$, the y-axis corresponds to the degradation D expressed in decibels (dB) measured between the minimum phase jitter, called Cramer-Rao limit, and that obtained by the invention. The curves are parameters for the signal-to-noise ratios SNR expressed in decibels (dB). The curves relate to an embodiment for which one has $B_L \times T = 0.002$. When $\lambda = 0$, the situation is created of a carrier recovery circuit not implementing the invention. It will be noticed that there is an optimum value of the weighting factor $\lambda$ that permits improvement of the performance obtained relative to that of a carrier recovery circuit not implementing the invention. This optimum value depends on the signal-to-noise ratio SNR. The improvement is considerable when the signal-to-noise ratio is low. It becomes less when the signal-to-noise ratio is high, which is caused by the fact that the decisions made by the decision means 28 (FIGS. 5 and 6) are nearly always correct.

B—PHASE ESTIMATION TECHNIQUE

Figure 9:
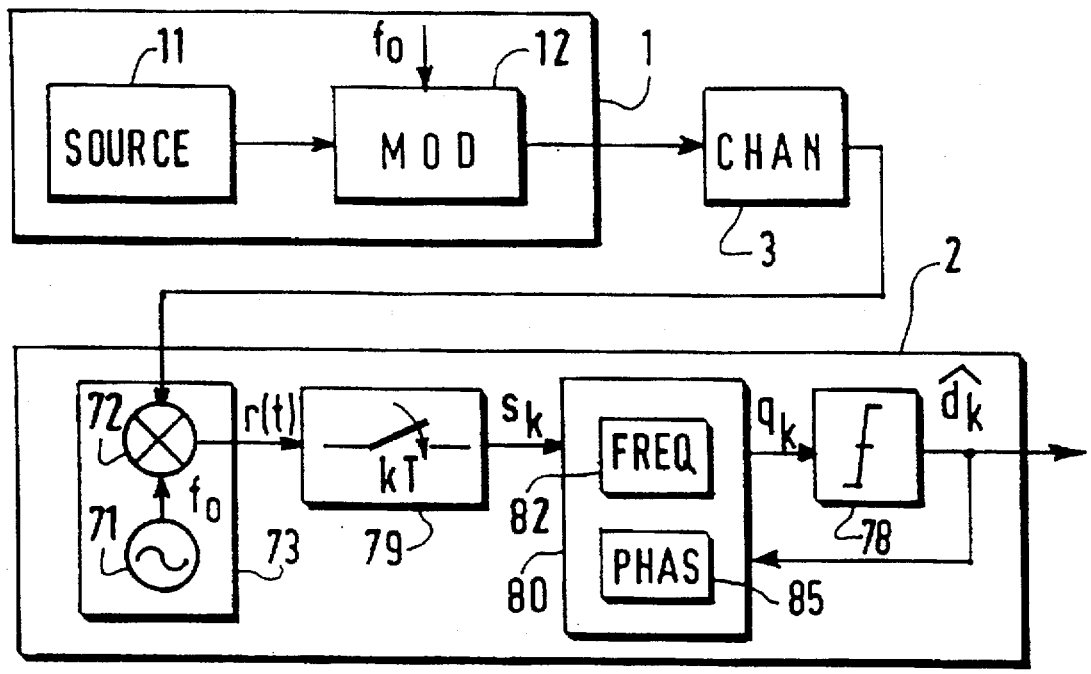
FIG. 9 shows a prior-art digital transmission system comprising a data transmitter, a transmitter channel and a data receiver (second technique)

For the second technique, FIG. 9 represents a digital transmission system of which only the receiver differs from that of the first technique. The receiver 2 comprises:

converting means 73 for converting the received IF signal into a baseband signal r(t) (the means for transforming the received HF signal into an IF signal (Intermediate Frequency) are not shown), digitizing means 79 for digitizing the baseband signal r(t) and producing samples $S_k$, decision means 78 for estimating the constellation state nearest to the decision-subjected point (point V) and for producing estimated samples $\hat{d}_k$ of the data transmitted by the transmitter, and synchronizing means 80 for estimating a phase difference between the estimated state and the digitized baseband signal (point P), and for digitally correcting the phase difference by forming a complex correction signal.

The converting means 73 comprise a local oscillator 71 which operates with a fixed frequency $f_0$, and a mixer 72 which mixes the IF signal with the local signal having frequency $f_0$.

The synchronizing means 80 digitally correct, on the one hand, the frequency differences and, on the other hand, the phase differences. To this end they comprise frequency correction means 82 and phase shifting means 85. The phase differences are determined by comparing the phase of the estimated samples $\hat{d}_k$ coming from the decision means 78 with the phase of the samples produced by the frequency correction means 82. This comparison provides the formation of a complex correction signal $e^{-j\phi}$ which is used for shifting the phase of the samples coming from frequency correction means 82.

Figure 10:
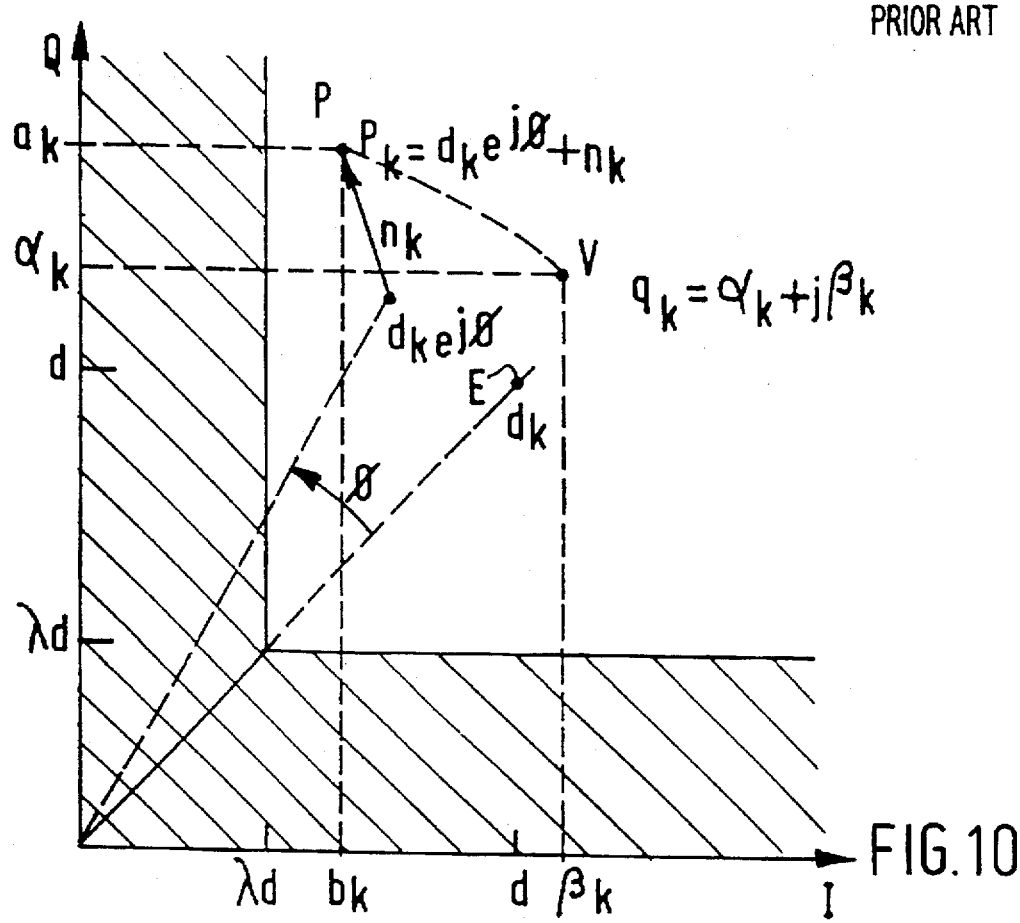
FIG. 10 shows a diagram of the disturbance caused by the transmitter channel and by the phase error.

With the phase estimator according to the second technique (FIG. 10), the symbol represented by point P ($p_k = a_k + jb_k$) will be corrected in phase and be transformed into a symbol represented by point V ($q_k = \alpha_k + j\beta_k$).

The receiver is thus to estimate a symbol $\hat{d}_k$ which is identical with the transmitted symbol $d_k$ based upon the symbol $q_k$. This is obtained via a decision operation.

To correct the phase error $\phi$ and produce a complex correction signal $e^{-j\phi}$, first an intermediate signal $u_k$ is to be calculated, given, for example, by $$u_k = \frac{\{p_k \times \hat{d}_k^*\}}{|\hat{d}_k|^2} = \frac{p_k}{\hat{d}_k} \quad (3)$$

where $\hat{d}_k^*$ is the conjugate value of the estimated symbol $\hat{d}_k$ and x represents a multiplication.

Experiments have shown that a phase estimator operating according to equation (3) shows good performance, provided that the decision that generates the estimated symbol $\hat{d}_k$ is correct. The moment this decision is erroneous, the phase estimator will no longer show good performance.

In the same manner as before, one reckons with the probability of a good decision for weighting the correction signal.

That which has been developed before for the point P ($a_k + jb_k$) is similarly applied to point V ($\alpha_k + j\beta_k$). When the point V is positioned in the hatched areas of FIG. 10, that is to say, outside zones containing the states, the weighting factor is such that:

$\gamma_k = z/(\lambda d)$ where z is equal to the smaller of the absolute values $\alpha_k$ or $\beta_k$, that is to say, $z = \min(|\alpha_k|, |\beta_k|)$ for a QPSK modulation and where $\lambda$ is a zone defining factor.

That which has been stated for the 16 QAM modulation (FIG. 4) also applies to the second technique.

Figure 11:
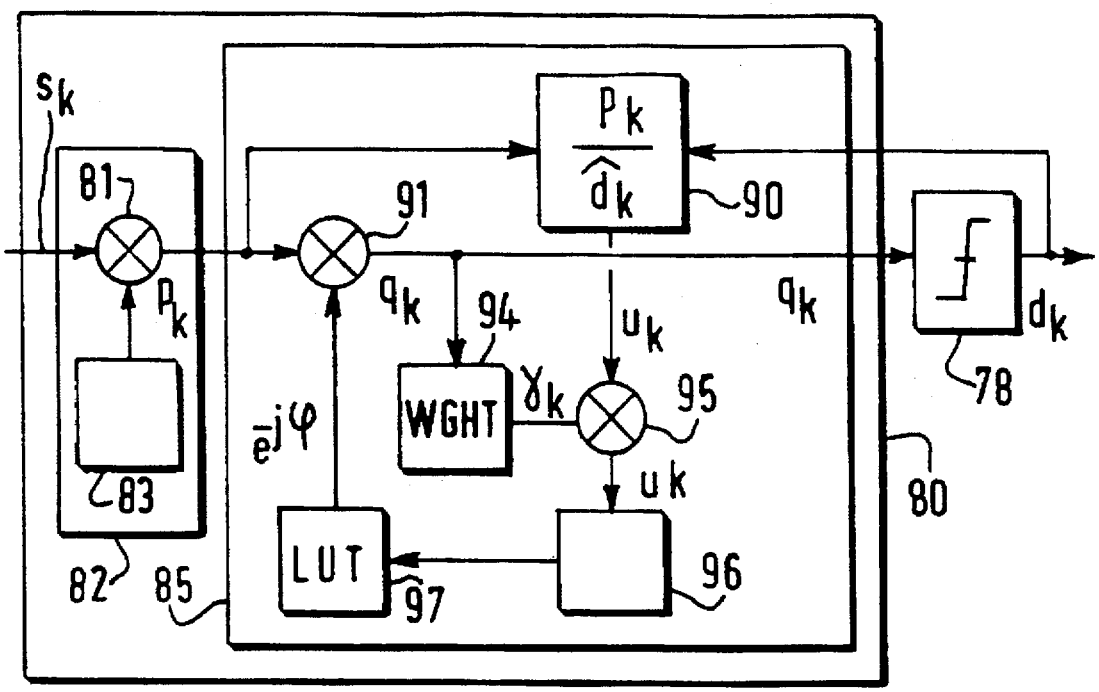
FIG. 11 shows a diagram of digital synchronizing means according to the invention (second technique)

FIG. 11 represents an embodiment for the second technique. Like elements to those of FIG. 9 are denoted by like references. The phase shifting means 85 form the correction signal $e^{-j\phi}$ based upon the components $\alpha_k$ and $\beta_k$ of the complex signal $q_k$ by causing, on the one hand, the correction signal $e^{-j\phi}$ to be proportional to the phase difference measured between the initial baseband signal and the nearest constellation state, when the point lies inside the zones Z11, Z13, Z31 and Z33, and by causing, on the other hand, the correction signal $e^{-j\phi}$ to vary according to said measured phase difference to which is applied a weighting factor that depends on the decision-submitted signal (point V), while the weighting factor progressively decreases from one to substantially zero between a zone border line and the boundaries defined earlier, when the decision-subjected point lies outside said zones. The phase shifting means 85 receive the samples $p_k$ and produce phase corrected samples $q_k$. They also receive estimated samples $\hat{d}_k$ from decision means 78.

The phase shifting means are used for compensating the phase difference between the received symbol (point P) and the nearest state of the constellation (point E) (FIG. 10) and for producing the complex correction signal $e^{-j\phi}$.

The estimated samples $\hat{d}_k$ enter calculation means 90 for calculating the complex intermediate signal $u_k$. Zone selection means WGHT 94 define the zones and determine the weighting factors $\gamma_k$ that have to be applied while the complex signal $q_k = \alpha_k + j\beta_k$ is taken into account. Multiplying means 95 then make it possible to weigh the intermediate signal $u_k$ to produce the weighted intermediate signal $u'_k$ used for addressing transforming means 97 which transform the weighted intermediate signal u'$_k$ into a complex correction signal e$^{-j\phi}$. The means 97 are formed, for example, by a look-up Table LUT. It is possible to replace the values u'$_k$ of the intermediate signal by mean values <u'$_k$> calculated from a sequence of baseband signal components calculated in calculating means 96.

Figure 14:
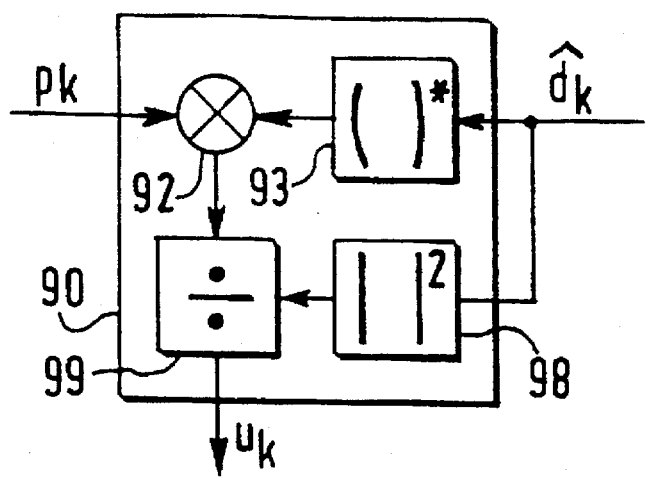
FIG. 14 shows a diagram of calculating means for calculating the intermediate complex signal which features the phase difference (second technique) and FIG. 15 shows curves indicating the performance obtained as a function of the zone defining factor (second technique).

FIG. 14 represents a first embodiment for calculating means 90 for calculating the intermediate signal u$_k$. They comprise means 93 (for example, a look-up Table) which determine the conjugate value of the estimated sample $\hat{d}_k$. The conjugate sample value is multiplied by sample p$_k$ in multiplier means 92. Furthermore, means 98 (for example, a look-up Table) determine the squared absolute value of the estimated sample $\hat{d}_k$ which is fed to divider means 15 which divide the data coming from the multiplier means 92 by the data coming from the calculation means 98 for calculating the squares of absolute values. Divider means 99 produce samples u$_k$ of the intermediate signal. According to a second embodiment, the means 90 may comprise a complex divider which calculates p$_k$/$\hat{d}_k$.

Zone selection means 94, which define the zones and determine the weighting factors $\gamma_k$, are preferably realised in the form of a look-up Table stored, for example, in a memory. They may as well be realised according to the diagram of FIG. 7 for a QPSK modulation. In this case a comparing device 50 compares the absolute values of $\alpha_k$ and $\beta_k$ and selects the smaller one to form the data z, so that z=min(|$\alpha_k$|,|$\beta_k$|). Divide z-by-$\lambda$d divider means 52 produce a quotient z/($\lambda$d) (connection 53) which is compared with a unit value in a comparator 54 which comparator applies a selection signal to a selector 55 which produces the weighting factor $\gamma_k$ that relates to signal q$_k$, so that:

$\gamma_k$=1 if z$\geq\lambda$d $\gamma_k$=z/($\lambda$d) if z<$\lambda$d.

The defining factor of zones $\lambda$ forms a given input data.

Figure 12:
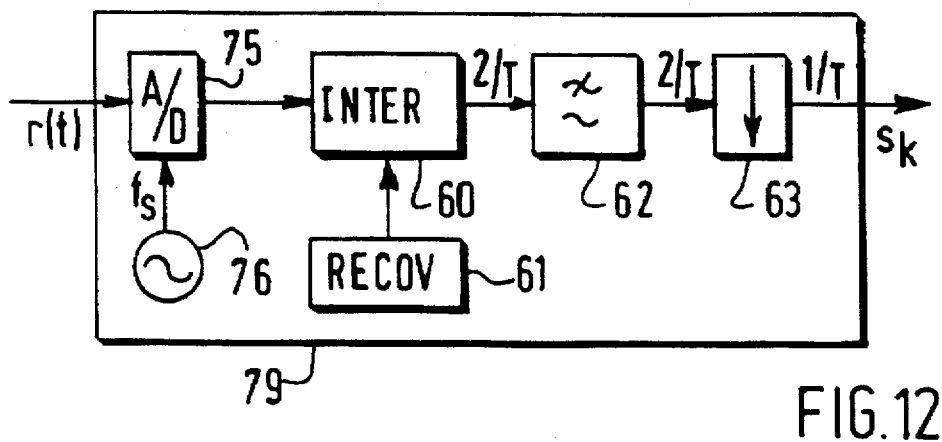
FIG. 12 shows a diagram of digitizing means for digitizing the baseband signal according to a first embodiment (second technique)
Figure 13:
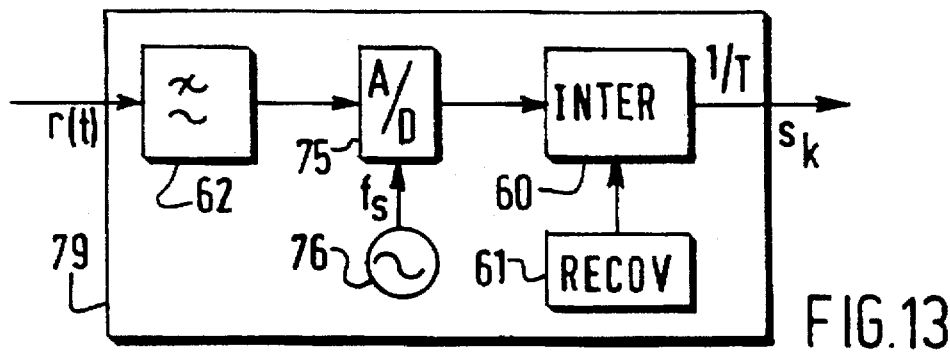
FIG. 13 shows a diagram of digitizing means for digitizing the baseband signal according to a second embodiment (second technique)

The means 79 (FIG. 9) for digitizing the baseband signal r(t) may be realised in various ways, among which the FIGS. 12 and 13 give two possible embodiments. The digitizing means 79 comprise an analog-to-digital converter A/D 75 controlled by a clock generator 76 that operates at a rate f$_s$ (FIGS. 12 and 13). The frequency f$_s$ is to be higher than the symbol rate 1/T on transmission, the samples are to be readjusted at this symbol rate. This is performed by interpolation means 60 controlled by recovery means 61, which operate at the symbol rate for FIG. 13 or at multiples of the symbol rate for FIG. 12. Interpolation means 60 are followed by digital filter means 62 in FIG. 12. FIG. 13 describes substantially the same situation with the exception that the filtering is performed on the analog signal r(t). In the case where the filter is a digital filter (FIG. 12), the rate at which the filter operates is to be at least equal to twice the transmit symbol rate 1/T. In this case, sub-sampling means 63 make it possible to recover the samples at the symbol rate.

Figure 15:
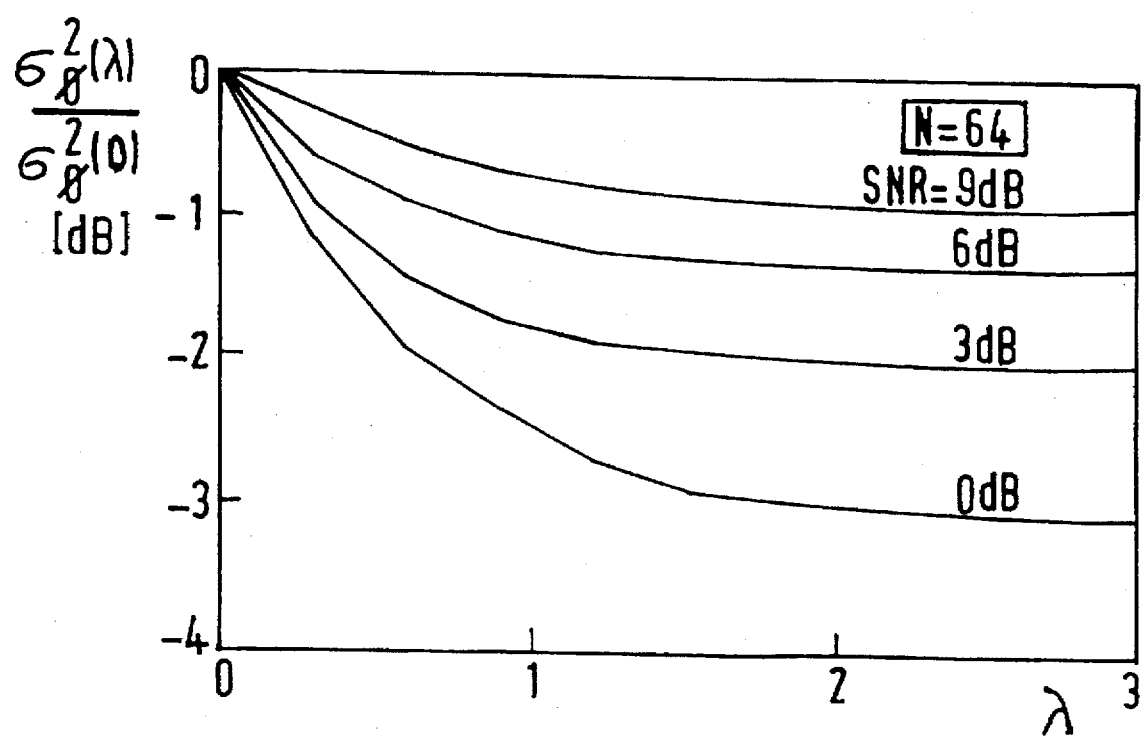

FIG. 15 represents the performance obtained with a receiver according to the second technique for a QPSK modulation. The x-axis corresponds to the zone defining factor $\lambda$, the y-axis corresponds to the improvement expressed by a ratio of variance $\sigma^2_\phi(\lambda)$ to variance $\sigma^2_\phi(0)$, which is the variance of the known phase estimator in the case where the weighted intermediate signal u'$_k$ is averaged over a sequence of N=64 values. The ratio expressed in decibels (dB), measures the minimum phase jitter. The curves are parameters of signal-to-noise ratio values SNR expressed in decibels (dB). When $\lambda$=0, the situation is obtained of a receiver not implementing the invention. It will be noticed that the curves are monotonously decreasing when the zone defining factor increases. The lower the signal-to-noise ratio, the more significant the observed improvement is.

I claim:

1. Digital transmission system comprising a transmitter and a receiver, which receiver comprises:

converting means for converting a received signal that has been encoded according to states of a constellation into a baseband signal comprising two mutually quadrature components, digitizing means for digitizing the baseband signal, decision means for estimating the constellation state nearest to the digitized baseband signal, synchronizing means for estimating a phase difference between the estimated state and the baseband signal, and for correcting the phase difference by forming a correction signal, characterized in that the receiver comprises synchronizing means which form the correction signal in dependence on zones of the plane I,Q in which the point that represents the digitized baseband signal is situated, the synchronizing means being such that, on the one hand, in first non-contiguous zones each containing a respective state of the constellation, the correction signal is proportional to the phase difference measured between the initial baseband signal and the nearest state of the constellation and, on the other hand, the synchronizing means being such that in second zones, outside the first zones, the correction signal varies with said phase difference weighted with a weighting factor that depends on the signal subjected to a decision called decision-subjected point here, while the weighting factor progressively decreases when the decision-subjected point passes a border line of the first zone nearest to said point up to a boundary situated at equal distance from adjacent pairs of states, while the boundary is the nearest boundary to said point.

2. System as claimed in claim 1, characterized in that the synchronizing means comprises an oscillator that can be controlled by the correction signal, while the oscillator activates the converting means for generating the components of the baseband signal, the synchronizing means further comprises a look-up Table which is addressed by the baseband signal components, and the Table supplies the correction signal adapted to each point of the plane I,Q.

3. System as claimed in claim 1, characterized in that the synchronizing means comprises an oscillator that can be controlled by the correction signal, while the oscillator activates the converting means for generating the components of the baseband signal, while the synchronizing means further comprises:

a) estimating means for estimating the phase difference, b) zone reconnaissance means which produces weighting factors relating to the zones, c) weighting means for weighting with the respective weighting factor the measured phase difference and for producing the correction signal adapted to each point of the plane I,Q.

4. System as claimed in claim 1, characterized in that the converting means comprises an oscillator oscillating freely at a fixed frequency for forming the baseband signal, and in that the synchronizing means comprises digital phase shifting means for estimating and converting the phase difference weighted with the weighting factor, into a complex correction signal which is digitally multiplied by the baseband signal components for shifting their phase.

5. System as claimed in claim 4, characterized in that the phase shifting means comprises:

generator means for generating an intermediate complex signal which determines the phase difference, zone reconnaissance means which produces weighting factors relating to the zones, weighting means for weighting with the respective weighting factor the complex intermediate signal that represents the phase difference, means for producing the complex correction signal based upon the weighted complex intermediate signal that represents the weighted phase difference.

6. System as claimed in claim 5, characterized in that the phase shifting means further comprises calculating means for calculating weighted mean values of the phase difference addressing the means for producing the complex correction signal.

7. Receiver for a digital transmission system, the receiver comprising converting means for converting a received signal that has been encoded according to states of a constellation into a baseband signal comprising two mutually quadrature components, digitizing means for digitizing the baseband signal, decision means for estimating a constellation state nearest to the digitized baseband signal, synchronizing means for estimating a phase difference between the estimated state and the baseband signal, and for correcting the phase difference by forming a correction signal, characterized in that the two components which define a point that represents the received signal in a plane I,Q in which are also indicated the states of the constellation, the synchronizing means forming the correction signal in dependence on zones of the plane I,Q in which the point that represents the digitized baseband signal is positioned, and are such that, on the one hand, in first non-contiguous zones each containing a respective state of the constellation, the correction signal is proportional to the phase difference measured between the initial baseband signal and the nearest state of the constellation and in that, on the other hand, the synchronizing means are such that in second zones, outside the first zones, the correction signal varies with said phase difference weighted with a weighting factor that depends on the signal subjected to a decision called decision-subjected point here, while the weighting factor progressively decreases when the decision-subjected point passes a border line of the first zone nearest to said point up to a boundary positioned at equal distance from adjacent pairs of states, whereas the boundary is the boundary nearest to said point.

8. Receiver as claimed in claim 7, characterized in that the synchronizing means comprises an oscillator that can be controlled by the correction signal, while the oscillator activates the converting means for generating the components of the baseband signal, the synchronizing means further comprises a look-up Table which is addressed by the baseband signal components, and the Table supplies the correction signal adapted to each point of the plane I,Q.

9. Receiver as claimed in claim 7, characterized in that the synchronizing means comprises an oscillator that can be controlled by the correction signal, while the oscillator activates the converting means for generating the components of the baseband signal, while the synchronizing means further comprises:

a) estimating means for estimating the phase difference, b) zone reconnaissance means which produces weighting factors relating to the zones, c) weighting means for weighting with the respective weighting factor the measured phase difference and for producing the correction signal adapted to each point of the plane I,Q.

10. Receiver as claimed in claim 7, characterized in that the converting means comprises an oscillator oscillating freely at a fixed frequency for forming the baseband signal, and in that the synchronizing means comprises digital phase shifting means for estimating and converting the phase difference, weighted with the weighting factor, into a complex correction signal which is digitally mixed with the baseband signal components for shifting their phase.

11. Receiver as claimed in claim 10, characterized in that the phase shifting means comprises:

generator means for generating an intermediate complex signal which determines the phase difference, zone reconnaissance means which produces weighting factors relating to the zones, weighting means for weighting with the respective weighting factor the complex intermediate signal that represents the phase difference, means for producing the complex correction signal based upon the weighted complex intermediate signal that represents the weighted phase difference.

12. Receiver as claimed in claim 11, characterized in that the phase shifting means further comprises calculating means for calculating weighted mean values of the phase difference addressing the means that produces the complex correction signal.

* * * * *